United States Patent
Shi

(10) Patent No.: US 7,824,792 B2
(45) Date of Patent: Nov. 2, 2010

(54) BATTERY COVER ASSEMBLY FOR PORTABLE ELECTRONIC DEVICE

(75) Inventor: Zheng Shi, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 191 days.

(21) Appl. No.: 12/241,190

(22) Filed: Sep. 30, 2008

(65) Prior Publication Data

US 2010/0014221 A1 Jan. 21, 2010

(30) Foreign Application Priority Data

Jul. 15, 2008 (CN) .......................... 2008 1 0302747

(51) Int. Cl.
*G06F 1/16* (2006.01)
(52) U.S. Cl. ................. 429/96; 361/679.58; 312/223.1; 312/223.2
(58) Field of Classification Search .............. 361/679.58
See application file for complete search history.

(56) References Cited

U.S. PATENT DOCUMENTS

| 3,728,664 | A | * | 4/1973 | Hurst | 439/341 |
|---|---|---|---|---|---|
| 3,999,110 | A | * | 12/1976 | Ramstrom et al. | 320/112 |
| 5,270,702 | A | * | 12/1993 | Krolak | 340/7.63 |
| 5,535,437 | A | * | 7/1996 | Karl et al. | 455/575.1 |
| 5,642,404 | A | * | 6/1997 | Hsu | 455/575.1 |
| 5,766,794 | A | * | 6/1998 | Brunette et al. | 429/97 |
| 5,928,809 | A | * | 7/1999 | Ju | 429/100 |
| 7,261,973 | B2 | * | 8/2007 | Tu et al. | 429/100 |
| 2003/0035265 | A1 | * | 2/2003 | DeLuga | 361/683 |
| 2004/0224220 | A1 | * | 11/2004 | Wang et al. | 429/96 |
| 2004/0224221 | A1 | * | 11/2004 | Chen et al. | 429/96 |
| 2005/0084747 | A1 | * | 4/2005 | Allen et al. | 429/97 |
| 2007/0026297 | A1 | * | 2/2007 | Qin et al. | 429/97 |
| 2007/0122693 | A1 | * | 5/2007 | Qin et al. | 429/97 |

* cited by examiner

*Primary Examiner*—Jayprakash N Gandhi
*Assistant Examiner*—Anthony Q Edwards
(74) *Attorney, Agent, or Firm*—Steven M. Reiss

(57) ABSTRACT

A battery cover assembly for a portable electronic device (100), the battery cover assembly includes a housing (10), a cover (10) and a locking mechanism (30). The cover defines a latching groove (242). The cover is hinged to the housing. The locking mechanism latches the cover to the housing. The locking mechanism includes a button (42) and a spring (44). The button slidably engages with the cover. The spring is disposed between the button and the cover, and the spring provides an elastic force to the button configured for allowing the button to lock with the latching groove.

8 Claims, 5 Drawing Sheets

… (1) …

BATTERY COVER ASSEMBLY FOR PORTABLE ELECTRONIC DEVICE

BACKGROUND

1. Field of the Invention

The present invention generally relates to battery cover assemblies and, particularly, to a battery cover assembly for use in a portable electronic device.

2. Description of Related Art

Batteries are widely used in portable electronic devices, such as personal digital assistants (PDAs), mobile phones, and so on. Conventional batteries are attachably received in the electronic device, and battery covers are designed to connect with housings of the electronic devices to package the batteries. The batteries have to be replaced by opening the battery covers when, for example, the batteries are damaged and/or dead (i.e. no longer rechargeable).

Although battery cover assemblies may be simple, the engagement between the battery cover and the housing of the mobile phone can be too firm to be easily detached from each other.

Therefore, there is room for improvement within the art.

BRIEF DESCRIPTION OF THE DRAWINGS

Many aspects of the battery cover assembly can be better understood with reference to the following drawings. The components in the drawings are not necessarily drawn to scale, the emphasis instead being placed upon clearly illustrating the principles of the battery cover assembly. Moreover, in the drawings, like reference numerals designate corresponding parts throughout the several views, in which.

DETAILED DESCRIPTION OF THE EMBODIMENTS

Figure 1:
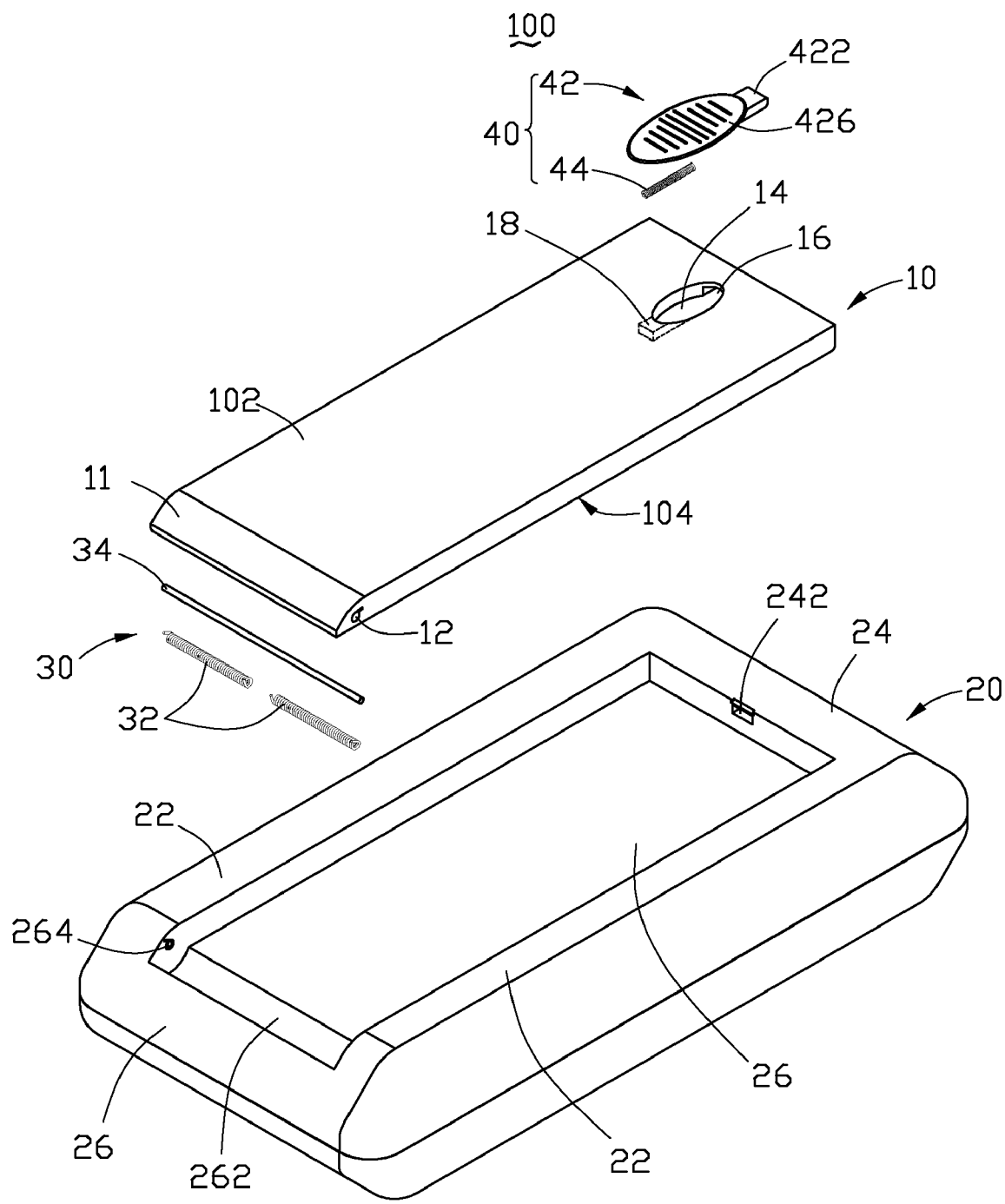
FIG. 1 is an exploded, isometric view of a portable electronic device employing a battery cover assembly in accordance with an exemplary embodiment.

FIG. 1 shows a portable electronic device 100, such as a mobile phone, employing a battery cover assembly. The mobile phone 100 is an exemplary application, for the purposes of describing details of a battery cover assembly of the exemplary embodiment. The battery cover assembly incorporates a battery cover 10, a housing 20, a hinge mechanism 30, and a locking mechanism 40. The locking mechanism 40 is configured for releasably latching (i.e. attaching, locking, engaging) the battery cover 10 to the housing 20.

The cover 10 is a substantially rectangular board including a pivot end 11, a top surface 102 and a bottom surface 104. The pivot end 11 defines pivot holes 12 exposed on both sides thereof. The top surface 102 defines an elliptical button hole 14 opposite to the pivot end 11, and communicating with the bottom surface 104. The bottom surface 104 defines a slot 16 and a receiving groove 18 at opposite sides of the button hole 14. The slot 16 communicates with the end of the cover 10.

The housing 20 includes two side ends 22, a locking end 24 and a connecting end 26, cooperatively defining a cavity 28 for receiving a battery (not shown) and the cover 10. The locking end 24 defines a latching groove 242. Each side end 22, adjacent to the connecting end 26, defines a fixed hole 264. The two fixed holes 264 are opposite to each other. The connecting end 26 defines an arcuate groove 262 between the fixed holes 264 for rotatably connecting the pivot end 11 of the cover 10.

The hinge mechanism 30 includes two torsional springs 32 and a shaft 34. The two torsional springs 32 are configured for being placed around the shaft 34.

Figure 2:
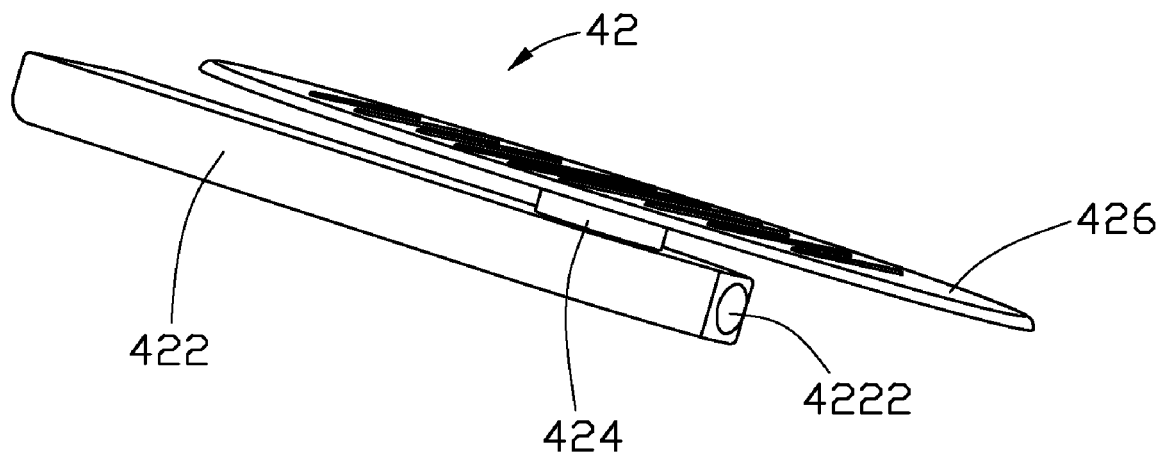
FIG. 2 is an enlarged view of the button of FIG. 1.

Referring to FIG. 2, the locking mechanism 40 includes a button 42 and a compression spring 44. The button 42 includes a slidable plate 422, a connecting portion 424 and an operation portion 426. The slidable plate 422 is parallel to the operation portion 426, and one end of the slidable plate 422 is connected to a middle area of the operation portion 426 by the connecting portion 424. An end of the slidable plate 422 under the operation portion 426 defines a receiving hole 4222 for receiving one part of the spring 44. The operation portion 426 is substantially elliptical, and larger than the button hole 14.

Figure 3:
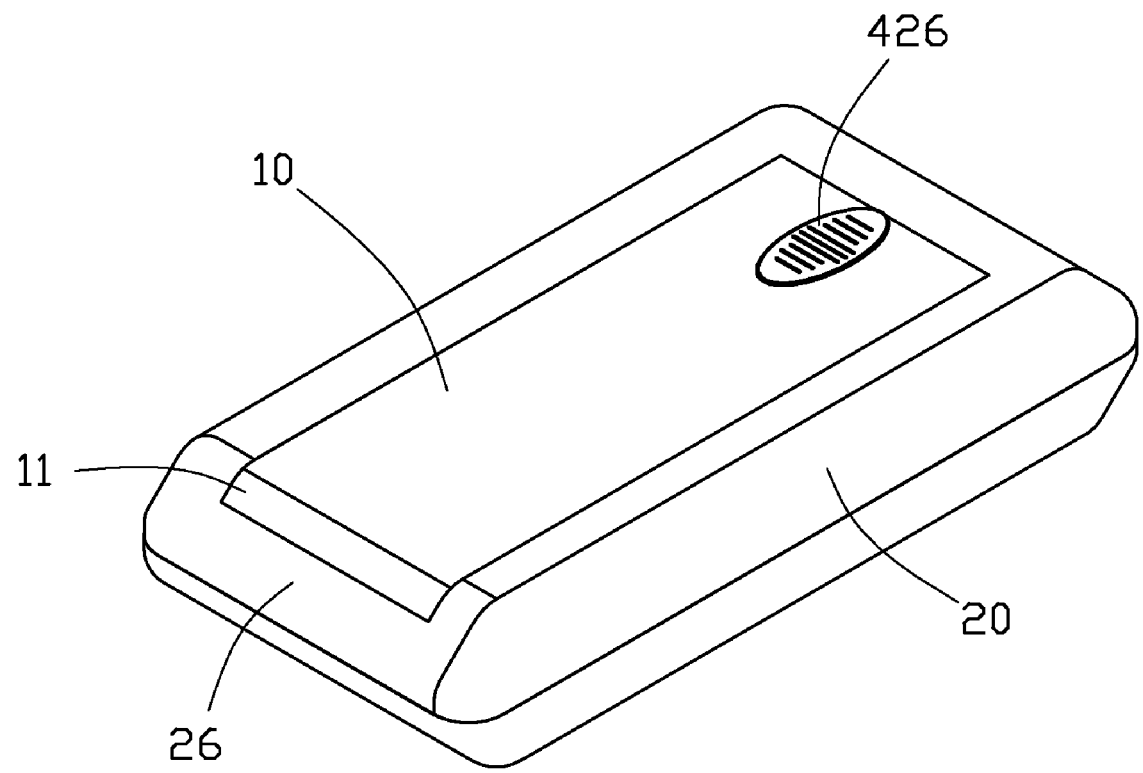
FIG. 3 is an assembled view of the portable electronic device shown in FIG. 1.
Figure 4:
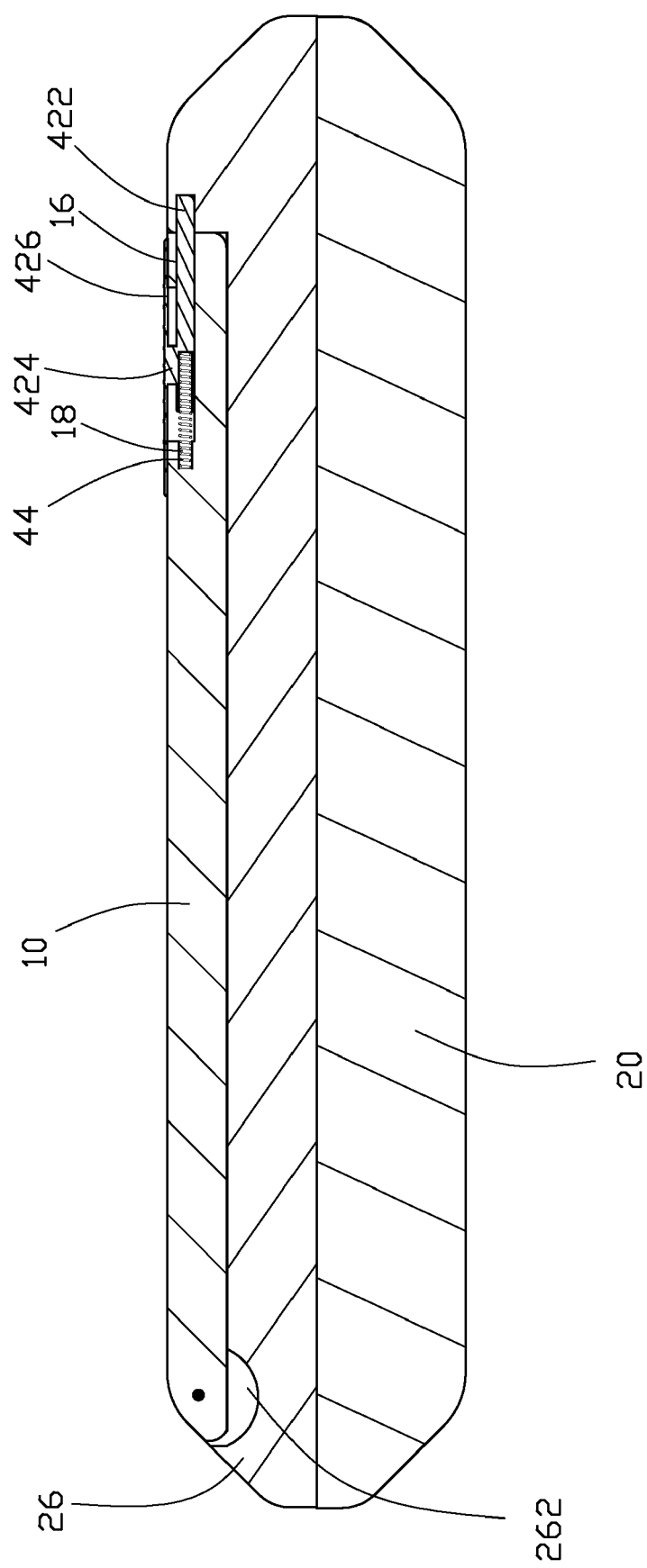
FIG. 4 is a cross-sectional view of the portable electronic device shown in FIG. 3.

During assembly of the battery cover assembly, referring to FIGS. 3 and 4, first, one end of the spring 44 is received in the receiving hole 4222 of the slidable plate 422. Then, the button 42 with the spring 44 is aligned with the button hole 14, and engages the other end of the spring 44 in the receiving groove 18 in a compression state. The slidable plate 422 is received in the slot 16, and extends out from the cover 10. The locking mechanism 30 is mounted to the cover 10. The operation portion 426 covers the button hole 14.

The cover 10 is hinged to the housing 20. First, the shaft 34 is inserted into the pivot hole 12 of the cover 10, and two ends of the shaft 34 extend out from the exposed ends of the pivot hole 12. The two torsional springs 32 are partially mounted in the exposed ends of the pivot hole 12 from two sides of the cover 10, and are placed around the shaft 34. Then, two ends of the shaft 34 with the remained exposed torsional springs 32 are inserted into the fixed holes 264 of the housing 20. Therefore, the two ends of the two torsional springs 32 are respectively fixed to the cover 10 and the housing 20. The battery cover assembly is finished.

To close the cover 10, the button 42 is slid toward the pivot end 11 to allow the slidable plate 422 to compress the spring 44. The slidable plate 422 slides until the slidable plate 422 is completely under the cover 10. At the same time, the cover 10 is rotated toward the housing 20. When the slidable plate 422 is aligned to the latching groove 242, the button 42 is released. The button 42 slides under the force of the spring 44 to lock the slidable plate 422 in the latching groove 242. Therefore, the cover 10 is locked in the housing 20.

Figure 5:
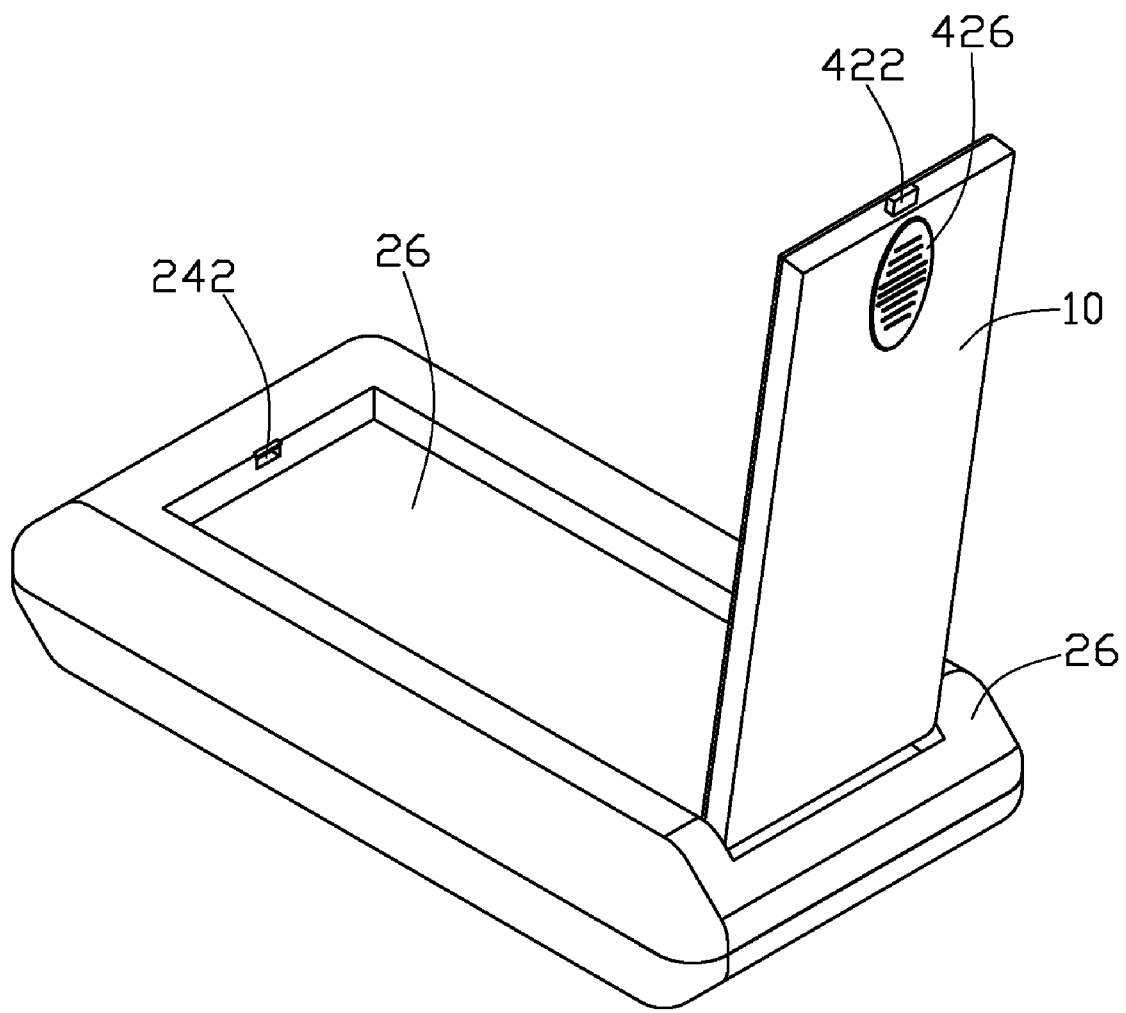
FIG. 5 is an open state view of the portable electronic device of FIG. 3.

Referring to FIG. 5, to open the cover 10, the operation portion 426 of the button 42 is pushed to slide by a user's finger toward the receiving groove 18. The slidable plate 422 exits the latching groove 242, and the cover 10 is automatically rotated relative to the housing 20 by the torsional springs 32.

As described above, the exemplary embodiment provides a battery cover assembly for portable electronic devices, such as mobile phones. When the button is pushed, the cover of the battery cover assembly can be easily opened under the role of the hinge mechanism. This push-button removal step makes the operation of the device more user-friendly.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A battery cover assembly for a portable electronic device, the battery cover assembly comprising:
   a housing defining a latching groove;
   a cover hinged to the housing, the cover defining a button hole and a receiving groove, the button hole and the receiving groove communicating with each other;
   a locking mechanism latching the cover to the housing, the locking mechanism comprising:
      a button slidably engaging with the button hole of the cover, the button including a slidable plate defining a receiving hole;
      a spring, one end of the spring received in the receiving hole, and the other end of the spring received in the receiving groove of the cover, and the spring providing an elastic force to the button for allowing the button to lock with the latching groove.

2. The battery cover assembly as claimed in claim 1, wherein the cover defines a slot the slot communicates with one end of the cover, the slot and the receiving groove are positioned at opposite sides of the button hole.

3. The battery cover assembly as claimed in claim 1, wherein the button includes a connecting portion and an operation portion, the slidable plate is parallel to the operation portion, and one end of the slidable plate is connected to a middle area of the operation portion with the connecting portion.

4. The battery cover assembly as claimed in claim 1, further comprising a hinge mechanism, wherein the hinge mechanism includes a shaft and a torsional spring, the torsional spring is placed around the shaft, and rotatably connects the cover to the housing.

5. The battery cover assembly as claimed in claim 4, wherein the cover includes a pivot end defining a pivot hole, the housing defines fixed holes in each side end thereof, the shaft passes through the pivot hole, and two ends of the shaft are received in the fixed holes, one end of the torsional spring is fixed in the fixed hole, and the other end thereof is fixed in the pivot hole.

6. A portable electronic device comprising:
   a housing defining a latching groove;
   a cover hinged to the housing, the cover defining a button hole, a slot and a receiving groove, the slot and the receiving groove being positioned at opposite sides of the button hole;
   a locking mechanism latching the cover to the housing, the locking mechanism comprising:
      a button slidably engaging in the button hole and the slot;
      an elastic element disposed between the button and the cover, and the elastic element providing an elastic force to the button for allowing the button to lock with the latching groove.

7. The portable electronic device as claimed in claim 6, wherein the button includes a slidable plate, a connecting portion and an operation portion, the slidable plate is parallel to the operation portion, and one end of the slidable plate is connected to a middle area of the operation portion with the connecting portion.

8. The portable electronic device as claimed in claim 7, wherein the slidable plate defines a receiving hole, one end of the elastic element is received in the receiving hole, and the other end of the elastic element is received in the receiving groove.

* * * * *